Jan. 28, 1958  H. T. KRAFT  2,821,231
TRANSVERSELY-SLITTED TIRE TREAD
Filed Dec. 31, 1954  2 Sheets-Sheet 1
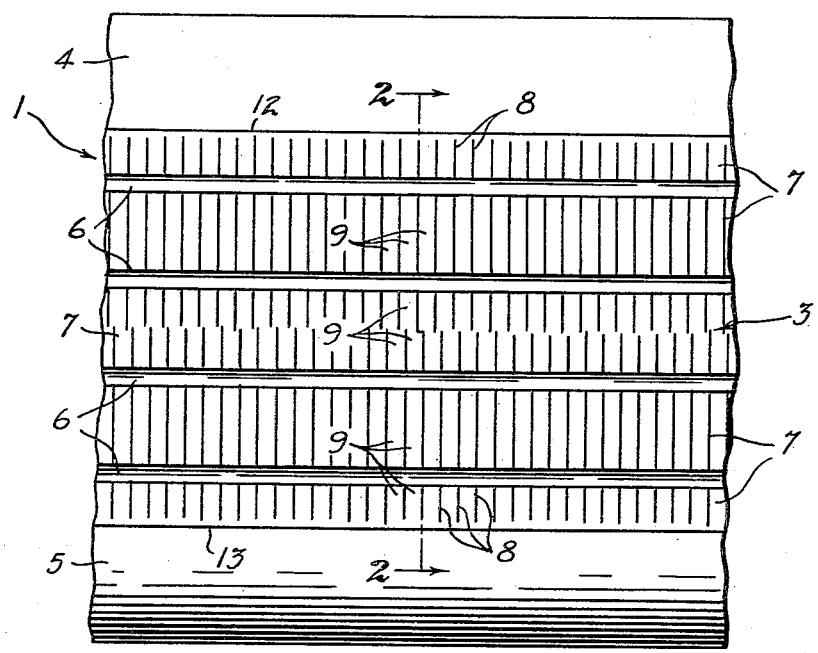
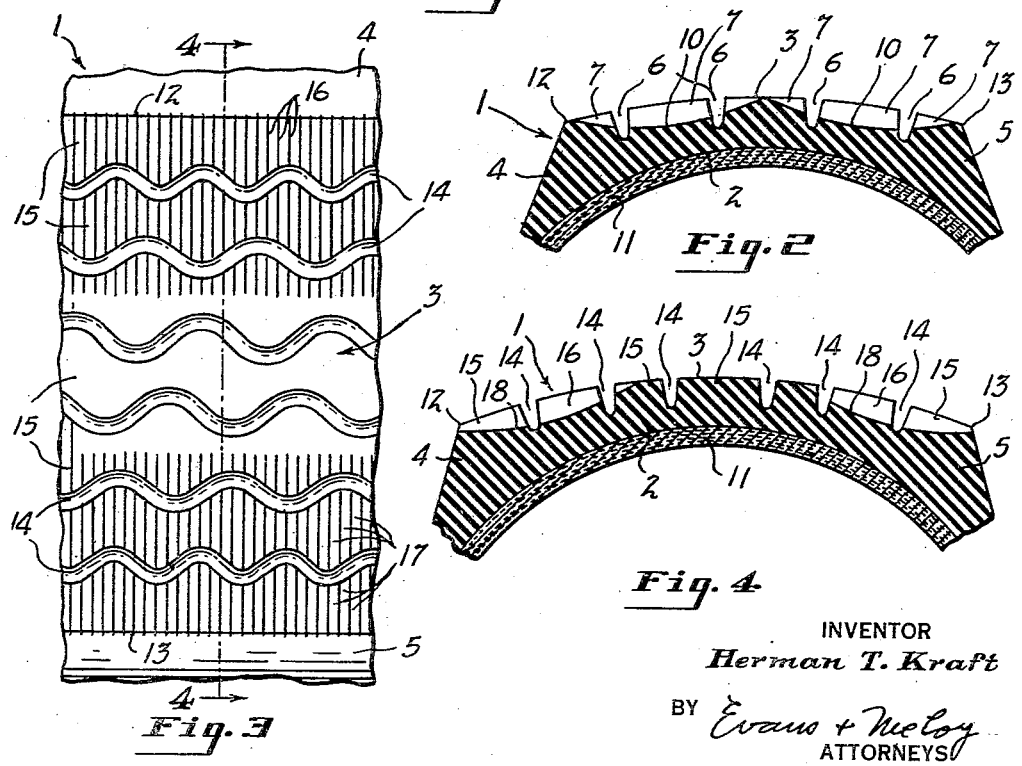
INVENTOR
*Herman T. Kraft*
BY *Evans + McCoy*
ATTORNEYS Jan. 28, 1958     H. T. KRAFT     2,821,231
TRANSVERSELY-SLITTED TIRE TREAD
Filed Dec. 31, 1954     2 Sheets-Sheet 2
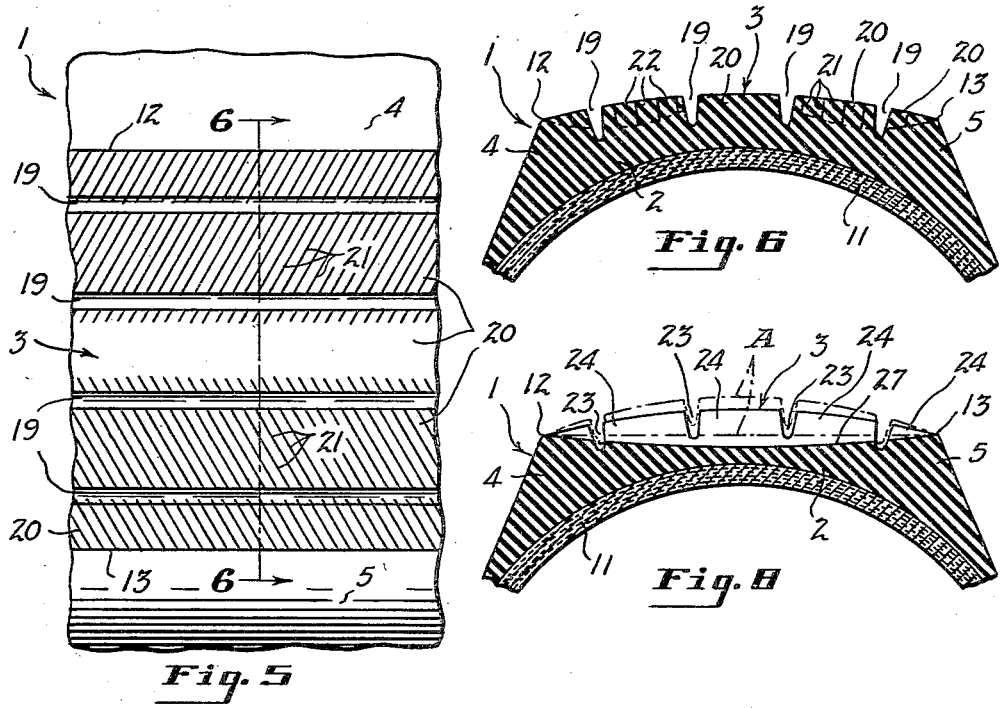
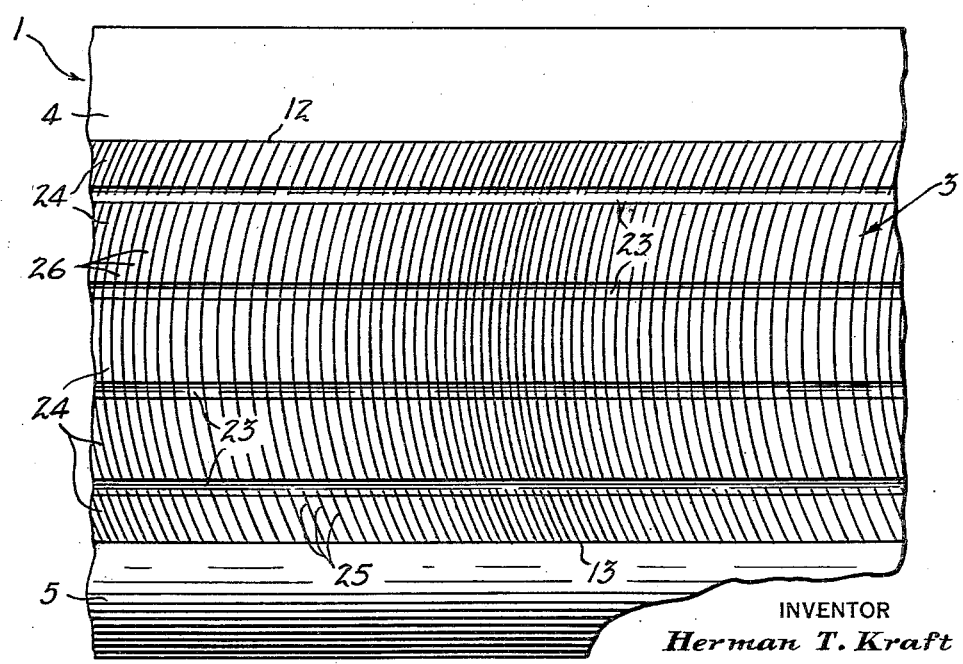
INVENTOR
*Herman T. Kraft*
BY *Evans + McCoy*
ATTORNEYS United States Patent Office 2,821,231
Patented Jan. 28, 1958

2,821,231

TRANSVERSELY-SLITTED TIRE TREAD

Herman T. Kraft, Akron, Ohio, assignor to The General Tire and Rubber Company, Akron, Ohio, a corporation of Ohio Application December 31, 1954, Serial No. 479,059

15 Claims. (Cl. 152—209)

The present invention relates to the slitting of tire treads and more particularly to a tire having transverse slits throughout the major portion of the road-engaging surface thereof dividing the tire tread into narrow transverse fins. The present application is a continuation-in-part of my copending application Serial No. 242,203, filed August 17, 1951, now abandoned.

We have found that a tire having circumferential ribs and grooves wears longer and has greater skid resistance when it is siped or slitted transversely throughout its circumference to form thousands of thin lateral fins. Excellent results are obtained when the shoulder edges of the tire are substantially uncut and the lateral sipes or slits terminate near the side edges of the road-engaging surface of the tire.

According to the present invention the tread portion of a tire is provided with a plurality of transverse slits throughout the circumference of its road-engaging surface, each slit decreasing in depth toward its opposite ends and having one end adjacent one side edge of said road-engaging surface. Each slit is of substantial length and preferably extends from one such side edge at least about ⅔ the distance to the medial plane of the tire. The bottoms of the slits are concave and preferably arcuate or of substantially circular curvature and intersect the road-engaging surface of the tire. The slits may terminate adjacent the medial plane of the tire, may extend beyond said plane, or may extend all the way across the road-engaging surface of the tire from one side edge to the other side edge thereof. However, best results are obtained where each slit has a length about one-third to one-half the width of the road-engaging surface of the tread and terminate adjacent one side edge of such surface. If the shoulder of the tire should be cut at such side edge, the depth of the cut should be less than ⅛ inch and preferably not substantially greater than about ¹⁄₁₆ inch. Inwardly of the side edge, the depth of the slits is preferably less than about ⁵⁄₁₆ inch or not substantially greater than the depth of the circumferentially extending grooves of the tire and less than the thickness of the tread portion of the tire. The slits may, for example, have a maximum depth equal to about 75 to 125 percent of the depth of the circumferential grooves of the tire.

The tire may be molded with any non-skid road-engaging surface but preferably with a series of circumferentially continuous grooves which divide the tire into a plurality of circumferential ribs. Such ribs preferably have a minimum average width at least about one-tenth the width of the road-engaging surface of the tire where said surface has a width less than about five and one-half inches. While straight grooves may be used, it is usually preferable, in order to obtain better traction, to employ zigzag or undulating circumferential grooves where the circumferential ribs have such a minimum average width.

The transverse slits divide the tread portion of the tire into a multiplicity of fins having an average width substantially less than one-quarter of an inch. The fins may have a width less than ⅟₂₀ or ⅟₂₅ of an inch or even less than ⅟₂₀₀₀ times the circumference of the tire. One of the circumferential ribs of the tire may therefore be divided by the transverse slits into more than two thousand fins. Where a tire has six or seven circumferential ribs, it may have more than fifteen thousand transverse fins.

An object of the present invention is to provide a pneumatic tire with improved traction and improved wear resistance.

A further object of the invention is to provide a rubber tire having narrow flexible transverse fins which will not readily tear off during normal operation of the tire.

Other objects, uses and advantages of the present invention will become apparent from the following description and from the drawings in which:

Figure 1 is a fragmentary plan view on a reduced scale of one form of tread design according to the present invention;

Figure 2 is a fragmentary transverse sectional view taken substantially on the line indicated at 2—2 in Fig. 1;

Figure 3 is a fragmentary plan view on a reduced scale of another form of tread design according to this invention;

Figure 4 is a fragmentary transverse sectional view taken substantially on the line indicated at 4—4 in Fig. 3;

Figure 5 is a fragmentary plan view on a reduced scale of another embodiment of the invention.

Figure 6 is a fragmentary transverse sectional view taken substantially on the line indicated at 6—6 in Fig. 5;

Figure 7 is a fragmentary plan view of another form of tread design of the present invention; and Figure 8 is a fragmentary cross-sectional illustration of the slits shown in Fig. 7.

Referring more particularly to the drawings, in which like parts are identified with the same numerals throughout the several views, Figures 1 and 2 show the improved tread of the present invention applied to a conventional type of fabric-reinforced pneumatic rubber tire 1 having a toroidal carcass 11 and a circumferentially-continuous abrasion-resistant rubber tread portion 2 that provides a road-engaging surface 3 of uniform width and a pair of shoulders 4 and 5 on opposite sides of said surface. The tread portion 2 is bonded to the fabric-reinforced carcass 11 of the tire 1 and increases in thickness from the medial plane of the tire to side edges 12 and 13 of the road-engaging surface 3.

The road-engaging portion of the tire is provided with a series of laterally spaced, circumferential grooves 6 (preferably at least four) which divide the tire into a plurality of circumferential ribs 7. As herein shown, the grooves 6 are of substantially uniform width and depth and the ribs 7 have a minimum width greater than one-tenth the width of the road-engaging surface 3.

The surface 3 is subdivided by a multiplicity of parallel transverse sipes or slits 8 into thousands of narrow transverse fins 9. The slits extend from points adjacent the opposite side edges 12 and 13 substantially to the medial plane of the tire, decrease in depth towards their opposite ends, and substantially fade out at their ends so that the fins are not readily torn from the tire.

The slits 8 have arcuate bottoms 10 which extend from the central portion of the tire to the side edges 12 and 13. The depth of the slits adjacent said side edges is less than one-eighth of an inch and is preferably less than about one-sixteenth of an inch. As herein shown, each slit 8 fades out at its opposite ends, and the bottom 10 of each slit intersects the surface 3 adjacent the medial plane of the tire and within one-sixteenth of an inch of one of the side edges 12 and 13.

The grooves 6 and the slits 8 may have any suitable depth which is usually at least about one-eighth inch less than the thickness of the tread portion 2 at the medial plane of the tire. When the tires are manufactured for use with ordinary passenger cars, the grooves 6 normally have a depth rom about ¼ to ⅜ inch. The slits 8 preferably have a maximum depth, between their opposite ends, not substantially greater than that of the circumferential grooves 6, and good results are obtained when the maximum depth of the slits is about ¾ to ⅞ the depth of the circumferential grooves. The slits 8, therefore, normally have a maximum depth from about 3/16 to 5/16 inch in a new tire.

Since the slits 8 are most economically formed by a cutting or siping machine, the fins 9 are preferably straight and of uniform width throughout their length. Also, the bottoms 10 preferably have a circular curvature as formed by a circular knife. If desired the slits may be disposed at an angle to the axis of the tire to provide a herringbone design or any other suitable design, but as shown in Figs. 1 to 4 the slits are preferably substantially parallel to the tire axis and perpendicular to the grooves 6 and to the medial plane of the tire.

The slits are spaced circumferentially around the entire circumference of the tire on opposite sides of the medial plane of the tire so as to cover the major portion of and preferably at least about two-thirds of the road-engaging surface 3. As shown in Figs. 1 and 2 the transverse slits 8 cover substantially the entire road-engaging surface of the tire and each fin 9 has a substantially uniform width of less than one-eighth of an inch. The average width of the portions of the tire 1 between the slits 8 is from about 1/20 to ¼ inch and preferably not greater than about ⅛ inch, but may be as low as 1/25 inch.

Figures 3 and 4 show a modified form of tire tread similar to that shown in Figs. 1 and 2 but with the central portion of the tire uncut. The tread portion 2 of the tire increases in thickness from the medial plane of the tire towards the opposite side edges 12 and 13 of the road-engaging surface 3 as in conventional tires. As herein shown, the road-engaging portion of the tire is divided by six sinuous circumferentially continuous grooves 14 into a series of laterally spaced undulating circumferential ribs 15, each having an average width equal to at least about one-tenth the distance between the opposite sides 12 and 13 of the road-engaging surface. One of the ribs 15 contains the medial plane of the tire and is uncut and circumferentially continuous, but the three ribs on each side of the central rib are divided by a multiplicity of circumferentially spaced lateral slits 16 into several thousand fins 17. The fins preferably have a uniform width less than about ⅛ inch and may have a width less than about 1/25 inch. The average width of the portions of the tread between the lateral slits should be substantially less than ¼ inch and is preferably less than about 1/20 inch as shown in Fig. 3. Where the tire is made for ordinary passenger cars, it will ordinarily have a diameter from about 28 to 34 inches and the road-engaging surface will ordinarily have a substantially uniform width of about four to six inches. Where such a passenger car tire has a tread design as shown in Figs. 3 and 4, the circumferential ribs 15 may be divided by the slits 16 into as many as fifteen thousand fins 17. In other words each of the six slitted ribs may be divided into more than 2500 fins.

Where the transverse slits are formed by cutting, such slits may have substantially no width (for example, much less than one-hundredth of an inch). Since the cutting operation may not remove any substantial amount of rubber from the tread, it is possible to cut several thousand fins in each rib of the tire.

As shown in Figs. 3 and 4, the grooves 14 have a depth of about five-sixteenths of an inch and the slits 16 have a maximum depth of about one-quarter of an inch and a depth of about one-sixteenth of an inch adjacent the side edges 12 and 13 of the road-engaging surface 3. Each slit 16 is shown herein as being parallel to the axis of the tire and extending transversely at least about one-third the width of the road-engaging surface 3 from the middle of a circumferential rib 15 across two other ribs to one side face of the tire adjacent one of the side edges 12 and 13. Like the slits 8 previously described, the transverse slits 16 fade out at their ends and have arcuate bottoms 18 of circular curvature that intersect the road-engaging surface 3 near the central portion of the tire on opposite sides thereof.

Figures 5 and 6 show a modified form of the invention wherein the tire 1 is provided with a herringbone-type tread design. The tread portion 2 of this tire is divided by a series of circumferential grooves 19 into a series (preferably at least four) of ribs 20 and is divided by a multiplicity of transverse slits 21 into thousands of fins 22 of uniform width throughout their lengths which fade out at their opposite ends.

Like the slits described in connection with the tread designs shown in Figs. 1 to 4, the slits 21 gradually decrease in depth towards their opposite ends and extend less than one-half the distance between the opposite side edges 12 and 13 of the road-engaging surface 3; but, unlike the former slits which are perpendicular to said side edges, the slits 21 are disposed at an angle with respect to the axis of rotation of the tire so as to provide a herringbone design.

Each slit 21 has an arcuate bottom of circular curvature which intersects the road-engaging surface of the tire at the central rib of the tire and at one of the side edges 12 or 13. The maximum depth of each slit 21 is shown herein as being less than that of the grooves 19.

Figure 8 shows in cross section a modified form of the present invention in which the tire 1 is provided with at least four circumferentially continuous grooves 23 which divide the road-engaging surface 3 of the tire into a series of laterally spaced circumferential ribs 24. The ribs are divided by a multiplicity of transversely arcuate lateral sipes or slits 25 into thousands of transverse fins 26, each of which has a uniform width.

Each of the transversely arcuate slits 25 has a smoothly curved concave bottom 27 which intersects the road-engaging surface 3 of the tire at the side edges 12 and 13 whereby the fins 26 gradually fade out at the shoulders of the tire and have a maximum depth at the center of the tire. The maximum depth of each slit is preferably not substantially greater than that of the circumferential grooves 23 and is less than the minimum thickness of the tread portion 2.

When the tire is being cut the tread is deformed by applying pressure against the tire shoulders so that the center portion of the tread bows or bulges radially outwardly substantially to the position shown by the dotted line A. A rotating knife may then cut a slit having a straight bottom as disclosed in said copending application Serial No. 242,203. The rotating knife on each revolution cuts across the tread in an arcuate path straight through the tread while the tire is held in the bowed position indicated at A. This operation leaves a slit 25 of predetermined size which is bowed inward or of variable depth across the tire tread width when the tire is released and returns to a neutral shape or position.

Figure 7 shows how the transverse slits 25 appear on the face of the tire. The cuts or slits are irregularly or variably spaced about the circumference of the tread. This arrangement avoids objectionable humming and other noises such as are set up by evenly spaced sipes. The spacing between sipes or slits 25 may be about one-sixteenth inch to about one inch or less, preferably averaging around 3/32 of an inch or less.

Where the slits 25 are evenly spaced, objectionable humming may be avoided by providing very closely spaced slits (for example, 25 or more to the inch) so that sounds from the tire have a high pitch outside the audible range.

It will be understood that the term "slits" as employed herein includes cuts which extend through more than one of the circumferential ribs of the tire even if such cuts are interrupted by the circumferential grooves forming such ribs.

It will be noted that each of the modified forms of the invention shown in Figs. 1 to 8 includes transverse slits having smoothly curved arcuate or concave bottoms intersecting the road-engaging surface of the tread, which slits decrease in depth toward their opposite ends and are cut into the shoulders to a depth at the side edges of the road-engaging surface less than one-eighth of an inch and preferably less than about one-sixteenth of an inch. In each of said modified forms the tread portion 2 of the tire increases in thickness from the medial plane of the tire to the side edges 12 and 13 of the road-engaging surface 3 and said surface is divided by a series of laterally spaced, circumferentially continuous grooves into at least four circumferential ribs, each having a width at least about equal to the depth of the grooves.

Since there may be more than 20 or 25 transverse slits per inch of circumference in each of the modified forms of the invention, there may be as many as 10,000 transverse fins formed in four circumferential ribs of a passenger car tire with a diameter of 28 to 34 inches, and six circumferential ribs of such tire may contain as many as 15,000 transverse fins.

Where the fins 1 in a circumferential rib are extremely thin, said rib should have a width of at least about one-quarter of an inch so as to have lateral stability, and the slits should have a depth not substantially greater than about one-sixteenth of an inch at the side edges of the road-engaging surface of the tire so that they will not tear off at the shoulders of the tire.

Since the central portion of the tire ordinarily has little effect on the road-gripping characteristics of a tire that is properly inflated, the slits preferably fade out and terminate before they are within about one-half inch of the medial plane of the tire. Where the slits gradually decrease in depth toward the central portion of the tire, there is less chance of tearing of the fins near such central portion.

It will be understood that, in accordance with the provisions of the patent statutes, variations and modifications of the specific devices herein shown and described may be made without departing from the spirit of the invention.

Having described my invention, I claim:

1. A pneumatic tire having laterally spaced circumferential grooves in the tread portion thereof forming a plurality of circumferential ribs, a plurality of slits extending laterally across said ribs and dividing the same into a plurality of narrow transverse fins, each slit having a length at least twice the width of each said ribs and gradually decreasing in depth at its opposite ends, the maximum depth of each slit being not substantially greater than the depth of said grooves, the bottoms of said slits being arcuate throughout their length and terminating adjacent the opposite side edges of the road-engaging surfaces of the tire.

2. A pneumatic tire having a tread portion with a road-engaging surface, shoulders adjacent the opposite side edges of said surface, a plurality of transverse slits closely spaced around the circumference of said tire throughout the major portion of said surface and fading out at their opposite ends, each slit terminating adjacent one of said side edges and gradually increasing in depth toward its center, the bottom of each slit being arcuate and extending at least about one-third the distance between said opposite side edges.

3. A tire as defined in claim 2 wherein the bottom of each slit intersects the road-engaging surface of said tire adjacent one side thereof and near the central portion of said tire, said bottom being concave and smoothly curved throughout its length.

4. A tire as defined in claim 2 wherein said slits divide the entire road-engaging portion of the tire tread into a plurality of fins, each fin having a transversely arcuate road-engaging surface of substantially uniform width throughout its length.

5. A pneumatic rubber tire having a series of circumferential grooves providing at least four circumferential ribs and a multiplicity of transverse slits providing at least ten thousand transverse fins, each slit having a smoothly curved concave bottom intersecting the road-engaging surface of the tire and having a length less than half the width of said surface, said tire having an external diameter from about 28 to 34 inches, and said road-engaging surface having a width no greater than about six inches.

6. A toric-shaped pneumatic rubber tire having a tread portion of increasing thickness from the central portion to the shoulders of the tire providing a road-engaging surface of substantially uniform width and having a series of laterally-spaced circumferential grooves of substantially uniform depth in said road-engaging surface dividing said surface into a series of separate circumferential ribs, each rib having an average width at least about one-tenth the width of said road-engaging surface, a multiplicity of narrow circumferentially spaced slits in said road-engaging surface, each slit extending laterally from adjacent one of the opposite side edges of said road-engaging surface a distance equal to at least three-tenths the distance between said opposite side edges and having a maximum depth not substantially greater than the depth of said circumferential grooves, said slits having smoothly curved concave bottom surfaces of relatively small curvature that intersect said road-engaging surface and terminate adjacent the side edges of said surface, each of said slits gradually decreasing in depth toward its opposite ends, said slits dividing the circumferential ribs into many hundreds of fins of substantially uniform width throughout their lengths, the average width of the portions of the tire between said slits being less than about one-quarter inch.

7. A pneumatic tire as defined in claim 6 wherein the bottoms of said slits are arcuate substantially throughout their lengths and intersect the road-engaging surface on opposite sides of the medial plane of the tire.

8. A pneumatic tire as defined in claim 6 wherein each slit has an arcuate bottom surface that intersects the road-engaging surface near the central portion of the tire.

9. A toric-shaped pneumatic rubber tire having a tread portion of increasing thickness from the central portion to the shoulders of the tire providing a road-engaging surface with a substantially uniform width of about 4 to 6 inches and having six laterally-spaced undulating circumferential grooves of substantially uniform depth in said road-engaging surface dividing said surface into seven separate circumferential ribs, each rib having an average width at least about one-tenth the width of said road-engaging surface, one of said ribs being uncut and located at the medial plane of the tire, thousands of narrow circumferentially spaced slits in said road-engaging surface dividing said surface into several thousand transverse fins, each slit extending parallel to the tire axis from the shoulder of the tire across two of said ribs and fading out at the central portion of a third rib and having a length in the neighborhood of about one-third the width of said road-engaging surface, the maximum depth of each slit being not substantially less than ¼ inch and not substantially greater than the depth of said undulating grooves, said slits having smoothly curved arcuate bottom surfaces of circular curvature throughout their length that extend into the shoulders of the tire, the average width of the portions of the tire between said slits being less than about ⅛ inch.

10. A tire as defined in claim 9 wherein said slits gradually decrease in depth toward their opposite ends and have a depth up to about 1/16 inch at the side edges of the road-engaging surface.

11. A toric-shaped pneumatic tire having a tread portion of increasing thickness from the central portion to the shoulders of the tire providing a road-engaging surface of substantially uniform width and having at least four laterally-spaced circumferential grooves of substantially uniform depth in said road-engaging surface dividing said surface into a series of separate circumferential ribs, each of the ribs between said grooves having an average width at least about one-tenth the width of said road-engaging surface, a multiplicity of narrow circumferentially spaced slits in said road-engaging surface extending generally in the direction of the tire axis and dividing the road-engaging portion of the tire into narrow transverse fins of substantially uniform width, each slit terminating adjacent one side edge of the road-engaging surface and extending to the central portion of the tire, each of the slits gradually decreasing in depth toward its opposite ends and fading out at the road-engaging surface, the bottoms of the slits being arcuately curved throughout their lengths, the average width of the portions of the tire between said slits being less than one-quarter of an inch.

12. A toric-shaped pneumatic tire having a tread portion of increasing thickness from the central portion to the shoulders of the tire providing a road-engaging surface of substantially uniform width and having at least four laterally-spaced circumferential grooves of substantially uniform depth in said road-engaging surface dividing said surface into a series of separate circumferential ribs, each of the ribs between said grooves having an average width greater than one-tenth the width of said road-engaging surface, a multiplicity of narrow circumferentially spaced slits in said road-engaging surface extending generally in the direction of the tire axis and dividing the road-engaging portion of the tire into narrow transverse fins of substantially uniform width, having a maximum depth several times their width, each slit terminating adjacent one side edge of the road-engaging surface and extending to the central portion of the tire, each of the slits gradually decreasing in depth toward its opposite ends and fading out at the road-engaging surface, the bottoms of the slits being arcuately curved, throughout their length, the average width of the portions of the tire between said slits being not in excess of about one-eighth of an inch.

13. A toric-shaped pneumatic rubber tire having a tread portion of increasing thickness from the central portion to the shoulders of the tire providing a road-engaging surface of substantially uniform width and having a series of laterally-spaced circumferential grooves of substantially uniform depth in said road-engaging surface dividing said surface into a series of separate circumferential ribs, each rib having an average width at least about one-tenth the width of said road-engaging surface, a multiplicity of narrow circumferentially spaced slits in said road-engaging surface, each slit extending laterally from adjacent one of the opposite side edges of said road-engaging surface a distance equal to at least three-tenths the distance between said opposite side edges and having a maximum depth not substantially greater than the depth of said circumferential grooves, said slits having smoothly curved arcuate bottom surfaces that intersect said road-engaging surface and terminate adjacent the side edges of said surface, each of said slits gradually decreasing in depth toward its opposite ends, said slits dividing each circumferential rib into thousands of transverse fins of substantially uniform width throughout their lengths, the maximum height of each fin being several times its width.

14. A pneumatic rubber tire as defined in claim 5 wherein the tire is toric-shaped with a diameter of about 28 to 34 inches and has a tread portion of increasing thickness from the central portion to the shoulders of the tire providing a road-engaging surface of substantially uniform width, the circumferential grooves of the tire being of undulating form, each circumferential rib having an average width of at least about one-tenth the width of said road-engaging surface, the transverse slits having a maximum depth of at least one-quarter of an inch and not substantially greater than the depth of said circumferential grooves and gradually decreasing in depth toward their opposite ends, each slit fading out near the central portion of the tire and having a depth at the shoulder of the tire not substantially greater than about one-sixteenth of an inch, each of the ribs at the sides of the tire being divided by the slits into thousands of transverse fins of substantially uniform width throughout their lengths.

15. A toric-shaped pneumatic tire as defined in claim 6 wherein each circumferential rib has an average height not substantially greater than its width, said slits being provided in said road-engaging surface on opposite sides of the medial plane of the tire and dividing the ribs on each side of said plane into thousands of transverse fins, the rib near the said medial plane being substantially uncut, each of said slits having a maximum depth between said medial plane and one of the shoulder ribs at the opposite sides of said road-engaging surface that is not substantially greater than the average depth of said circumferential grooves, the fins of the cut ribs between the medial plane and the shoulder ribs having an average width of about one-twentieth to one-eighth inch.

References Cited in the file of this patent

UNITED STATES PATENTS

| | | |
|---|---|---|
| 2,094,636 | Bull | Oct. 5, 1937 |
| 2,186,180 | Sloman | Jan. 9, 1940 |
| 2,201,668 | Kraft | May 21, 1940 |
| 2,207,101 | Maynard | July 9, 1940 |
| 2,272,879 | Hargraves | Feb. 10, 1942 |

FOREIGN PATENTS

| | | |
|---|---|---|
| 6,255 | Great Britain | 1915 |